United States Patent [19]

Itoh

[11] 4,091,600
[45] May 30, 1978

[54] ROTARY CAPSULE DIRECTION ARRANGING AND FILLING EQUIPMENT

[75] Inventor: Toshiharu Itoh, Osaka, Japan

[73] Assignee: Kabshiki Kaisha Osaka Jidoki Seisakusho, Sakai, Japan

[21] Appl. No.: 729,604

[22] Filed: Oct. 4, 1976

[30] Foreign Application Priority Data

Feb. 4, 1976  Japan .................................. 51-11665

[51] Int. Cl.² .......................... B65B 1/04; B65B 43/40
[52] U.S. Cl. .................................... 53/282; 53/381 A;
198/396; 198/400; 221/173
[58] Field of Search ...................... 53/381 A, 186, 281,
53/282, 285, 276, 277, 279; 221/171, 173, 156;
198/374, 396, 480, 397, 392, 400, 531, 484;
193/10

[56] References Cited

U.S. PATENT DOCUMENTS

| 1,839,820 | 1/1932 | Wilkie | 53/281 |
|---|---|---|---|
| 2,412,637 | 12/1946 | Smith | 53/281 |
| 2,630,953 | 3/1953 | Kath | 53/281 |
| 3,070,932 | 1/1963 | Hoefliger | 53/281 |
| 3,613,861 | 10/1971 | Whitecar | 198/392 |
| 3,759,365 | 9/1973 | Aronson | 198/396 |
| 3,811,552 | 5/1974 | Wagers, Jr. et al. | 198/397 X |
| 3,978,640 | 9/1976 | Crossley et al. | 53/282 X |

Primary Examiner—Othell M. Simpson
Assistant Examiner—Horace M. Culver

[57] ABSTRACT

Randomly oriented capsules are arranged so they are all in a definite direction by an efficient rotary system, rather than by an inefficient linear reciprocating system. In addition, an efficient rotary device takes the cap off each capsule, fills each capsule, and then caps each capsule all in an automatic manner. Various mechanisms of this invention are so constructed as to rotate synchronously with one another.

4 Claims, 12 Drawing Figures

ROTARY CAPSULE DIRECTION ARRANGING AND FILLING EQUIPMENT

BACKGROUND OF THE INVENTION AND PRIOR ART

A capsule direction arranging device which makes a linear reciprocating movement for arranging randomly oriented capped capsules in a single direction has heretofore been used to arrange capped empty capsules contained in a hopper in random directions so that they are all oriented in a definite direction so that a medicine or the like may be conveniently put into the capsules. Buth this type of machine is capable, at the most, of arranging the directions of only about 120 capsules in a line per minute. While machines in other related fields have been developed so that they operate at a very high speed, this type of machine is very inefficient. It may be thought possible to put many machines of this type side by side to increase production. However, such an arrangement may result in complexity of the overall system. What is more, it is difficult to equalize the operating speed of the various parts and to cause them to operate synchronously with one another. From the operational point of view, such an arrangement also has the defect in that the equipment cost is extraordinary.

OBJECTS AND BRIEF SUMMARY OF THE INVENTION

An important object of this invention is to provide a system to arrange automatically the directions of the caps of capsules which are being supplied in random orientations so that they all face in a definite direction.

A second object is to produce such as capsule arrangement by means of a rotary system.

A third object is to provide means in said system to remove the cap from each capsule automatically.

A fourth object is to provide means in said system to put medicine or the like into each capsule automatically.

A fifth object is to provide means in said system to cap the filled capsule automatically.

To achieve these objects in accordance with this invention, a drum is provided which is continuously rotated, and capsules are inserted into entrance holes provided on the circumference of the said drum, and there is provided a device for arranging the directions of the caps of such capsules so that they are all in the same direction while the drum is rotating. A plurality of the said devices for arranging the directions of the capsules can be provided for achieving a higher capacity. By making each such device in the form of a rotating body which rotates synchronously with the others, a change from one device to another can be made quite smoothly. Indeed, the device of this invention is capable of accurately arranging 500 capsules in a line and filling them up automatically and mechanically with medicine or the like per minute. This is a little over four times the capacity of the conventional type of machine. The structure is quite simple and can be easily adjusted. Thus this invention provides a high capacity system at at low cost.

BRIEF DESCRIPTION OF THE DRAWINGS

The attached drawings show one embodiment of this invention. In the drawings.

DETAILED DESCRIPTION OF THE INVENTION

Figure 1:
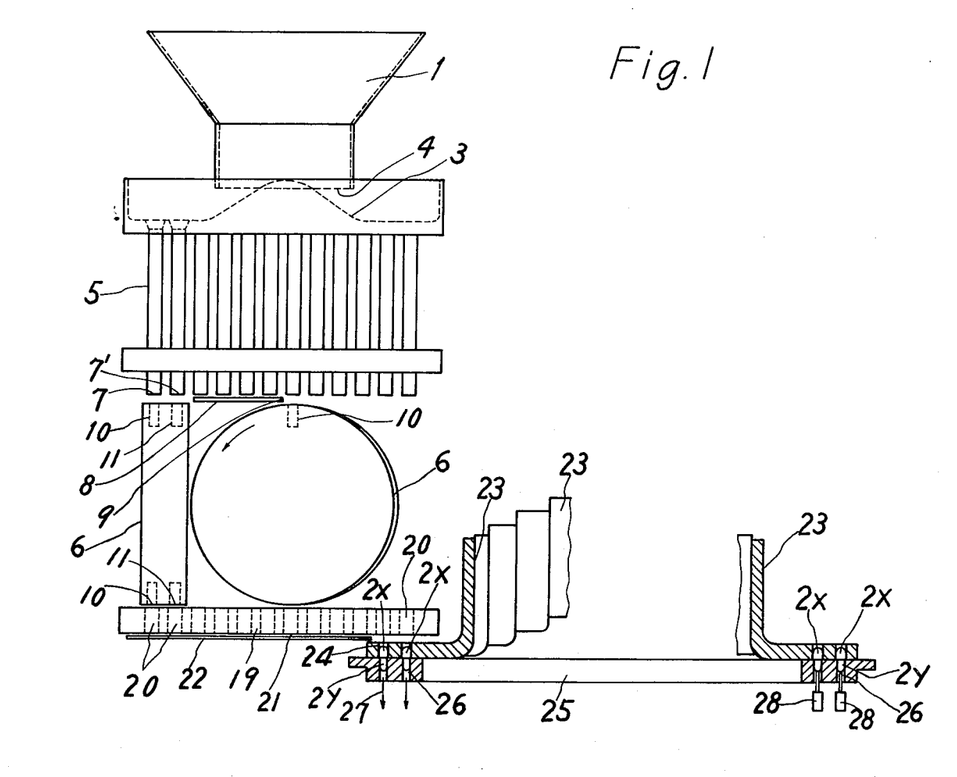
FIG. 1 is a schematic side elevation, partly in section, of the entire machine according to this invention, with a portion being broken away.
Figure 2:
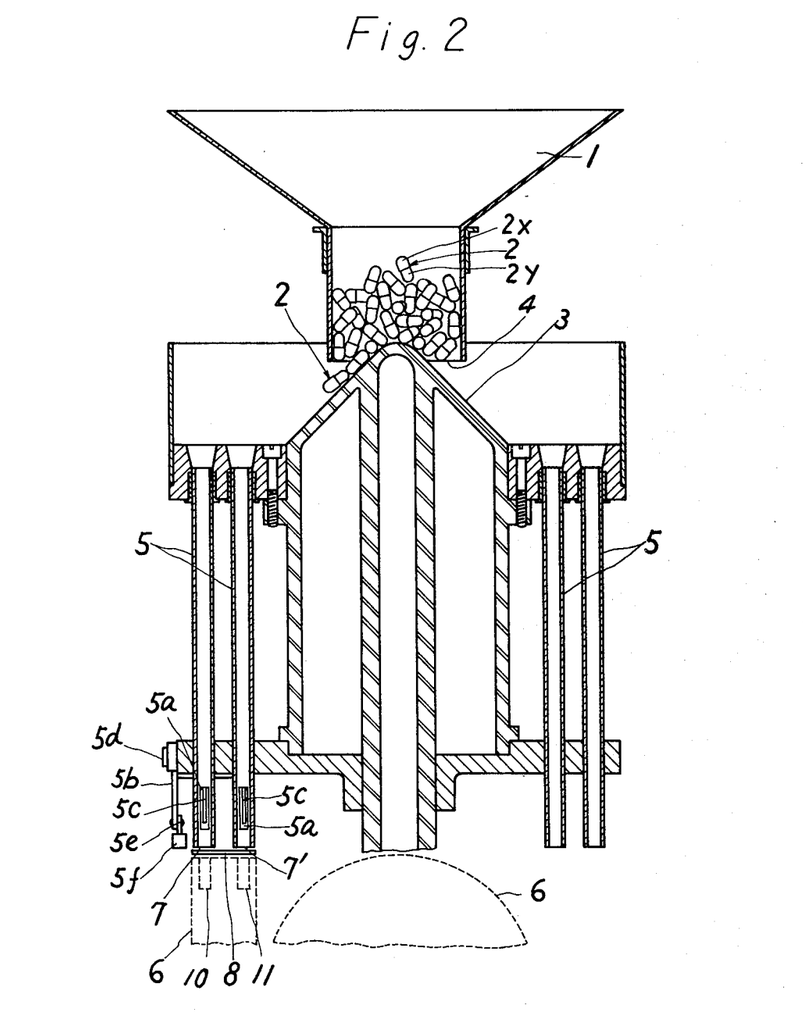
FIG. 2 is a longitudinal sectional view of a capsule feeding device forming part of the machine of FIG. 3.
Figure 6:
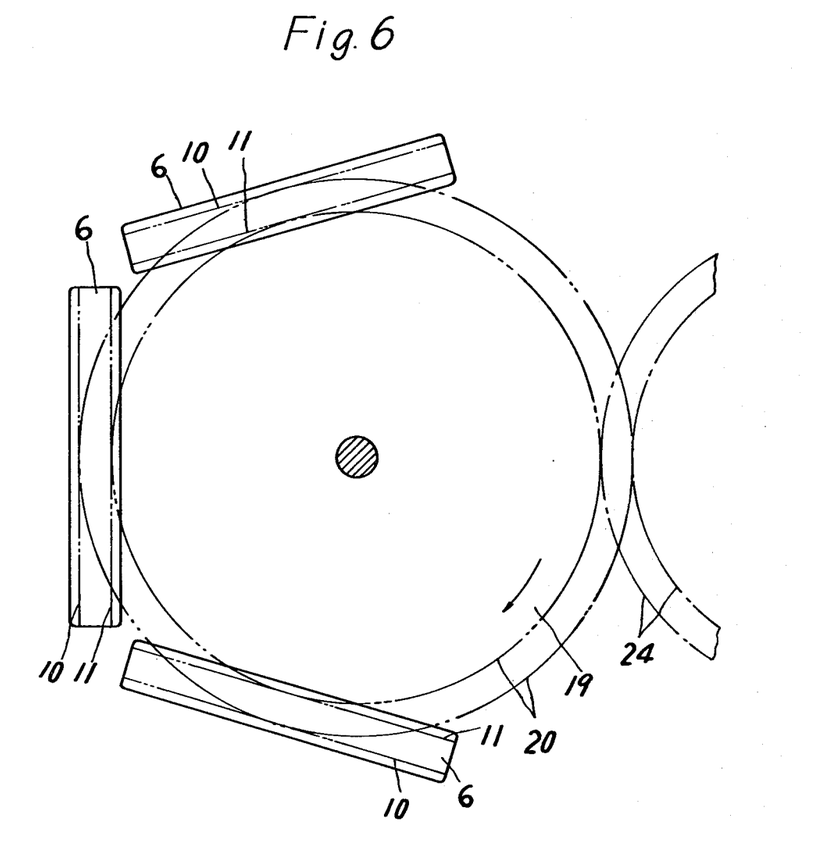
FIG. 6 is a diagrammatic plan view showing the relation between three drums and disks.
Figure 7:
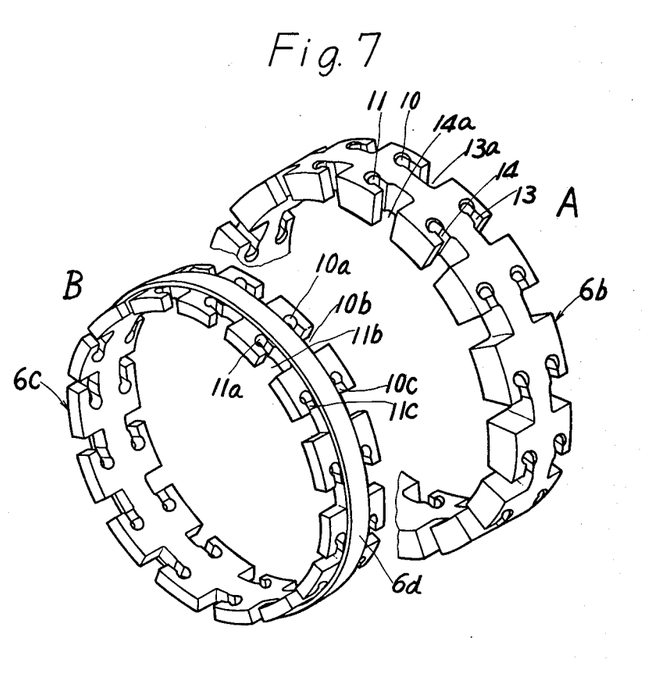
FIG. 7 is an exploded prespective view of the principal parts of the drum.
Figure 8:
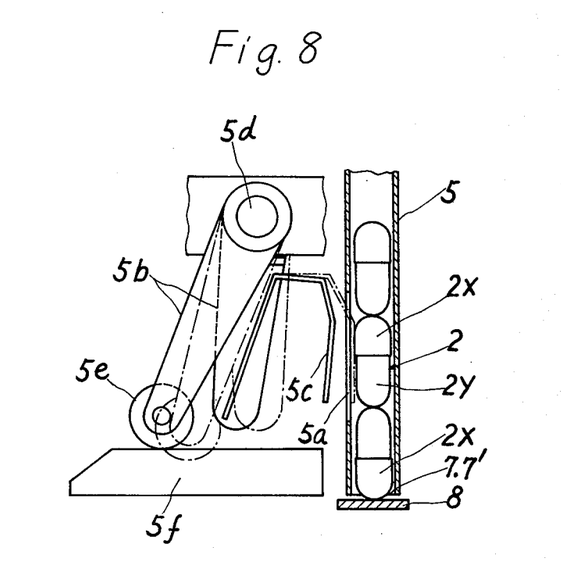
FIG. 8 is a side elevation, partly in section, of the principal parts of the capsule feeding device.

A hopper 1 contains capped empty capsules 2 which are randomly oriented. A rotating plate 3 is provided with a conical center projection under an mouth 4 at the lower portion of the hopper 1. Two concentric rows of pipes 5 with funnel shaped upper ends extend vertically and downwardly from the rotary plate 3 in which capsules from plate 3 are caused to stand in rows. There is provided an opening 5a near the lower end of each pipe 5 at a distance above the lower end about equal to the length of a capsule. A lever 5b for each radial row of pipes 5 has a shutter 5c for each pipe fixed to the end thereof. The shutters 5c are so mounted so as to move into and out of the opening 5a. A shaft 5d mounts a bent middle portion of the lever 5b on the rotary plate supporting frame 3a. A roll 5e on the other end of the lever 5b from the shutters 5c makes contact with the face of a cam 5f, and according to the shape of the face of the cam 5f causes the shutters 5c to move out of the opening 5a as shown in full lines in FIG. 8 or to enter the opening 5a as indicated by dotted lines, and press against the side of a falling capsule. The accurate movement of each shutter 5c controls capsules so that they are fed one by one in good order to receiving holes 10 and 11 for respective capsules in drums 6 in the next part of the apparatus. As seen in FIG. 6 three dums 6 are arranged respectively under pipes 5 for receiving capsules from the rows of capsules standing in the pipes. The numeral 8 designates a guide plate. There are three guide plates in all, one of which is shown in FIGS. 1 and 2. These three guide plates are respectively placed under the lower ends of pipes 5 between the tops of the three drums 6. The guide plates 8 close the lower ends 7 of the pipe 5 the end edge 9 of the respective guide plates 8 being adjacent the top of the peripheries of the drums 6 to expose the capsule receiving holes 10 and 11 at the uppermost point on the circumference of each of the drums 6 to only the pipes 5 immediately above them so as to allow a capsule to drop into the respective holes 10 and 11. These parts constitute what is called the capsule feeding device.

Next, there will be described what is generally called the direction arranging device.

As shown in FIG. 3-5E and 7, each of the drums compresses means which arranges the cap orientation so that the cap of each of the capsules is in the same direction. The outermost circumference of ech of the drums 6 is constituted by an outer ring 6b, on both sides of which there are concave recesses 13a and 14a adjacent and spaced circumferentially from the capsule receiving holes 10 and 11. Between the recessed 13a and 14a and capsule receiving holes 10 and 11 there are openings 13 and 14 large enough to allow a capsule body 2y to pass through, but not sufficiently large to pass a cap 2x. There is an inner ring 6c coaxial with the outer ring 6b. The inner ring 6c has a circular convex portion 6d in the middle portion of its outer circumference. There is provided a groove 12a on both sides of the circular convex portion 6d between the inner circumference of the outer ring 6b and the outer circumference of the inner ring 6c. Direction arranging pieces 12 extend laterally into the grooves 12a from both sides of the drum. Inner capsule receiving holes 10a and 11a are provided in the inner ring 6c aligned with capsule receiving holes 10 and 11 in the outer ring 6b across the grooves 12a. When a capsule 2a or 2b is dropped from the pipes 5 into the capsule receiving holes 10 and 11 the said entrance holes 10 and 11 are aligned with the inner capsule receiving holes 10a and 11a across the groove 12a. In the inner ring 6c are provided concave recesses 10b and 11b which are counterparts to the recesses 13a and 14a and are provided between adjacent inner capsule receiving holes 10a and 11a. There are also provided openings 10c and 11c between the inner capsule receiving holes 10a and 11a and the recesses 10b and 11b. The said openings 10c and 11c are lare enough to allow the smaller diameter capsule body 2y to pass therethrough, but not the larger diameter cap 2x. A pusher guiding plate 17b is positioned within the inner circumference of the inner ring 6c. There is more or less radially attending guiding grooves 17c on the opposite side faces of the guiding plate 17b, one for each capsule receiving hole 10a and 11a, and the central portion of the plate 17b is rotatable around a stationary shaft 16 by means of a bearing 16c. When capsules are dropped and inserted into the capsule receiving holes 10 and 11, they tend to bound upwards and out of the holes 10 and 11 due to their elasticity. To overcome this difficulty, a suction hole 16d is provided in inner ring 6c and is connected by a hole 16e with the inner capsule receiving holes 10a and 11a. When capsules are placed in the capsule receiving holes 10 and 11, suction through the holes 16d momentarily sucks the capsules in the radially inward direction in order to draw them safely into the inner capsule receiving holes 10a and 11a. A cam 15 is provided along both sides of the pusher guiding plate 17b with its central portion fixed to the stationary shaft 16. Cam grooves 15a and 15b are provided in the inner side of each cam 15. A pusher 17 is slidably inserted in each guiding groove 17c of the pusher guiding plate 17. Each pusher 17 has a roller thereon engaging in the cam grooves 15a and 15b. The rolls 17a travel in the stationary cam grooves 15a and 15b as the guiding plate 17 and pushers rotate in accordance with the rotation of the drum 6, causing the pushers to advance toward or withdraw from the outer circumference of the drums 6, according to the form of the cam grooves 15a and 15b.. Each pusher 17 has a projection 18 at its edge. The projection 18 is somewhat narrower in the transverse direction of the pusher 17 than the central portion of the pusher 17. A gear 16a is rotatably mounted on the stationary cam 15 by means of an attaching material 16b and the bearing 16c. Rotating portions of the drums 6, that is the pusher guiding plate 17b, the inner ring 6b, the outer ring 6c, and so forth are so mounted on the inside of the outer circumference of the attaching material 16b that they freely rotate around the stationary shaft 16 and the cams 15 are stationary when the gear 16a is rotated by an outside force. The capsule receiving hold 10 and 11 are located just under the respective positions of the holes 7 and 7' at the ends of the pipes 5 for receiving capsules from the standing rows of capsules, the capsules in the pipes can be transferred to the capsule receiving holes 10 and 11, while they are turned in either of two directions. One is that in which the capsule body 2y is radially outwardly with respect to the center of the drums 6. Capsules turned in this direction are designated in FIG. 3 by 2b. The other is that in which the cap 2x is radially outwardly. Capsules turned in this direction are designated by 2a. The capsule receiving holes 10 and 11 contain these capsules as they lie in the radial directions, as described above. With the rotation of the drums 6, the capsule receiving holes 10 and 11 travel, for example, from the top center position as indicated by the arrow in FIG. 3 to the diagonally left position. As has been described above, there are usually two positions in which the capsules 2 lie in the groove 12a: one is with the cap turned radially outwardly, and the other is with the cap radially inwardly.

Figure 3:
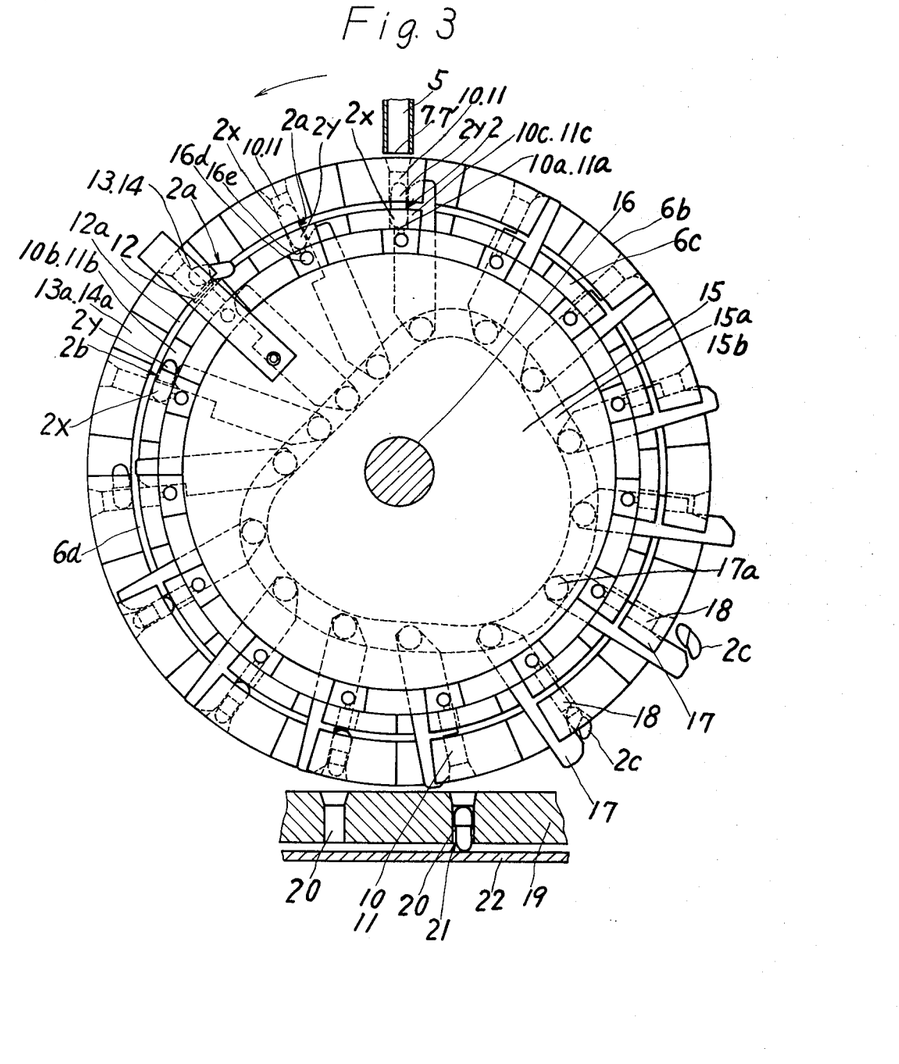
FIG. 3 is a sectional side elevation of a direction arranging drum forming part of the machine of FIG. 3.
Figure 4:
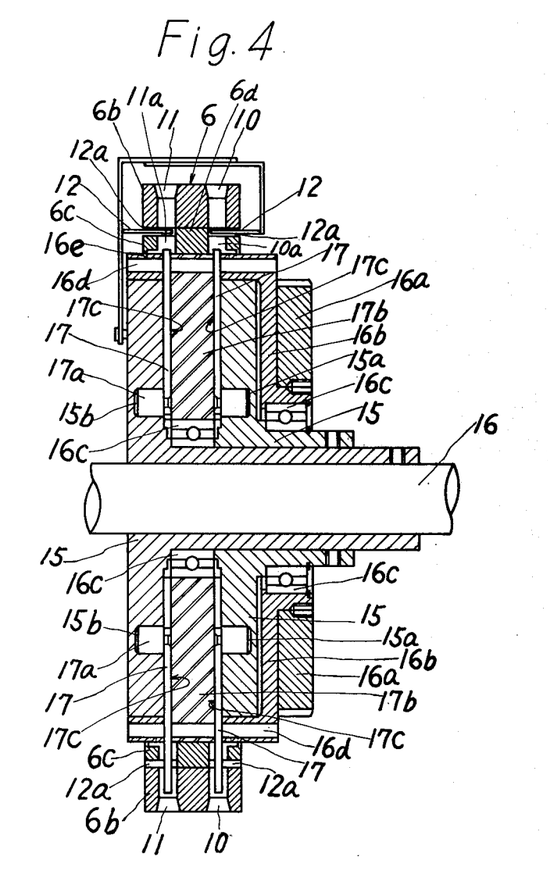
FIG. 4 is a diametral section of the drum of FIG. 3.

As has been described above, the capsules 2a and 2b which are respectively radially positioned in the capsule receiving holes 10 and 10a, and 11 and 11a opening radially outwardly from the outer circumference of the drums 6, come into contact with direction arranging pieces 12 which are stationary in the grooves 12a, extending into the grooves 12a from laterally of the drum while the drums 6, are rotating (FIGS. 3 and 4). In this case, the side of the capsule 2a the cap 2x of which is toward the outside is brought into engagement with the direction arranging piece 12, and, as shown in FIG. 3, the cap 2x is blocked by the opening 14 or 13 in the outer ring 6b from moving out of the capsule receiving hold 10 or 11, while the body 2y is pushed by the direction arranging piece 12 towards the recess 13a or 14a, and the capsule 2a is now directed circumferentially in a position in which the cap 2x is ahead of the body 2y relative to the direction of rotation. Similarly, the side of the capsule 2b also engages the direction arranging piece 12, and the cap 2x is blocked by the opening 10c or 11c from moving out of the capsule receiving hole 10a or 11a, and the cap body 27 is pushed by the direction arranging piece 12 towards the recess 10b or 11b, and the capsule 2b is now in a position in which the cap 2x is ahead of the body 2y.

Thus, when a capsule which has been received with the cap 2x facing outwardly, it will be in the outer ring, and when a capsule has been received with the cap 2x facing inwardly, it will be in the inner ring. In either case, the direction of the capsule is such that the cap 2x is ahead of the body 2y. The openings 13, 14, 10c and 11c are large enough to allow the smaller diameter capsule body 2y to pass through, but not the larger diameter cap 2x. Unless they have this prescribed width at all times, correct operation cannot be expected.

When they are used for long, these openings 13, 14, 10c and 11c will tend to be worn out and become unusable any more. In this invention, when the wall of any of the openings is worn out and the opening becomes wider, it can be repaired so as to have its regular width in the following manner. First, a gauge with a suitable width is inserted in the opening. Then, the gauge is pinched with a jig from outside, and then it is tightened up with a vise from outside of the opening. By repairing the opening from time to time, as has been described above, the apparatus of this invention can be used for a long time.

In addition to a regular capsule with a body capped with a cap 2x, there are such inferior goods as a cap 2x without a body 2y and a body 2y without a cap 2x among capsules which are contained in the cap receiving holes 10 and 11. When such a cap 2x alone or such a body 2y is contained in the capsule receiving holes 10 and 11, it cannot have its direction arranged even if it comes in contact with the direction arranging piece 12. Therefore, such an inferior article cannot be inserted in the regular openings 13, 14, 10c and 11c, and does not move into the recesses 13a, 14a, and then is automatically driven out of the drums 6. Thus, the direction arranging piece 12 of this invention automatically drives out the cap 2x alone or the capsule body 2y alone.

With respect to capsules 2a and 2b positioned circumferentially in the openings 13, 14, 10c, 11c with their caps ahead of the bodies, as described above, the pusher 17 for the corresponding opening advances radially outwardly according to the shape of the cam grooves 15a and 15b and will push the side of the tail portion of each of the capsule bodies 2y so as to turn the direction of each capsule from the circumferential direction to the radial direction, and also will push the capsules into the capsule receiving holes 10 and 11. In this case, a suction device 21, which is opposite the capsule receiving holes 10 and 11 at the bottom of the drum 6, as shown in FIG. 3, has an open mouth, and sucks the capsules 2 in the holes 10 and 11 out of the drum 6 with the cap of each capsule on the top of the vertically oriented capsule, and feeds it to the next process, as will be described hereinbelow.

Figures 5A, 5B, 5C, 5D, 5E:
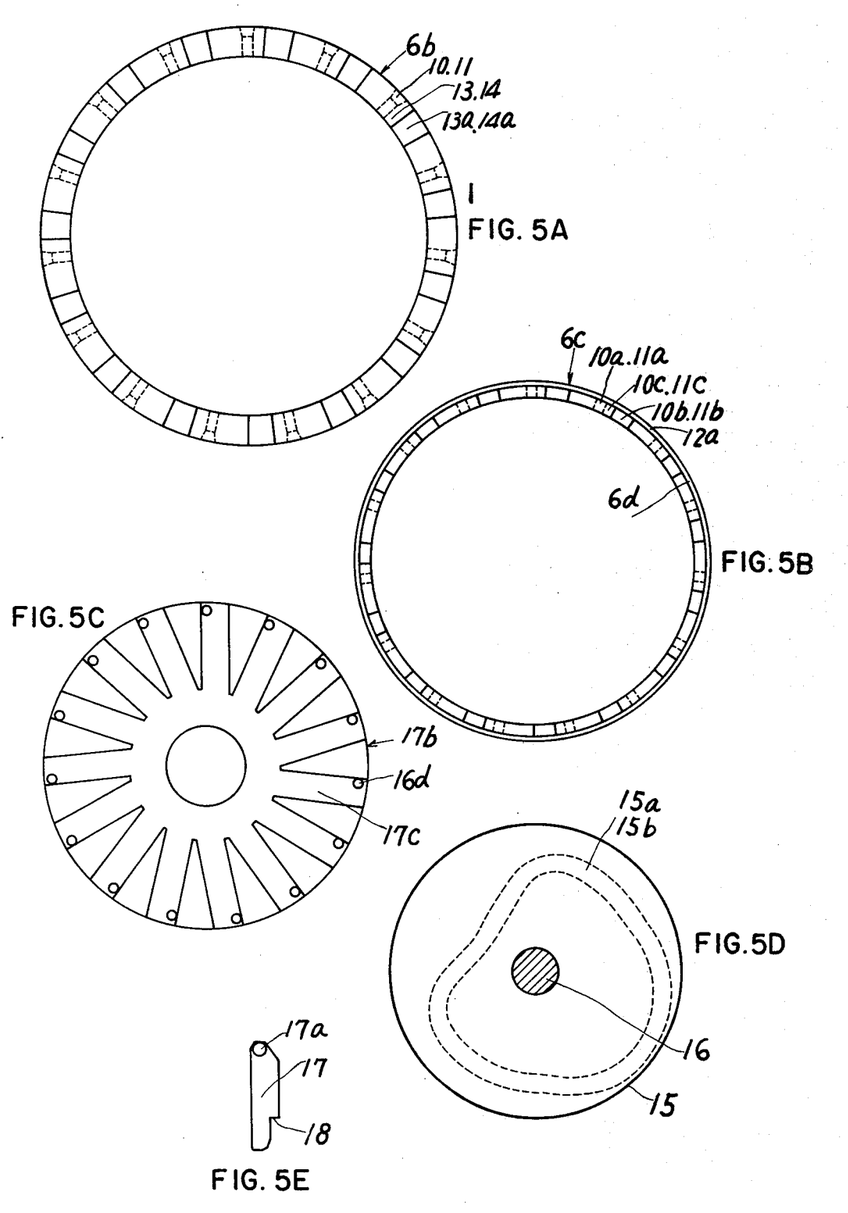
FIGS. 5A–5E are elevation views of the parts of the drum of FIG. 3, FIG. 5A showing the outer ring, FIG. 5B the inner ring, FIG. 5C a pusher guiding plate, FIG. 5D a cam, and FIG. 5E a pusher.

Among these capsules, however, there are some which get out of a shape for some reason or other. Such defective capsules are not sucked out of the drum 6, and consequently do not advance towards the next process, but just stay in the holes 10 and 11. They will get in the way of the next capsule to be handled by the drum if they are left there. But in the device of the present invention, the cam grooves 15a and 15b have a shape for causing the pushers 17 to move further in the radially outward direction, and the projection 18 has the surface radially inwardly from the outer end of the pusher 17 (FIG. 5-E).

Thus, after the satisfactory capsules have been driven into capsule receiving holes 10 and 11 by the outer end of the pusher 17 and sucked out of drum 6 for feeding to the next process, the pusher 17 is further pushed toward the outer circumference of the drum 6 during further rotation of the drum, and the edge of the projection 18 pushes defective capsules 2c remaining in the capsule receiving holes 10 and 11 out of these holes. As the defective capsules 2c are driven out after the holes 10 and 11 have advanced one pitch from the location of the capsule receiving holes for the next process, the defective capsules 2c will be completely driven out of this machine. Therefore, the device of the present invention is ready to receive more capsules for orienting them without stopping the machine to remove defective capsules.

Next, there will be described what is generally called a device to cause capsules to stand in rows.

As shown in the schematic diagram of FIG. 1, a disk 19 having holes 20 therein to vertically position the capsules in rows is located below the three drums 6 with the holes 20 arranged in two parallel rows around the circumference of the disk 19 at the locations corresponding with the positions of holes 10 and 11 at the bottoms of the drums 6, so that capsules 2 from the respective holds 10 and 11 in the three drums 6 can deliver capsules thereto in turns. A suction device, schematically indicated at 21, is located directly below the lowest holes 10 and 11 of each of the drums 6, and the disk rotates in synchronism with the rotation of the drums 6. A stationary plate 22 is provided beneath the lower ends of the holes 20 in the disk 19 so as to cover the bottoms of the holes 20 except the holes at a discharging position. Thus, the plate 22 has the effect of supporting each of the capsules 20 arranged in perfect order so as to prevent the capsules from dropping out of the disk 19 when they are at any position other than the discharge position.

There will now be described what is called the filling device. A plurality of cap holders 23 are arranged adjacent to each other around a circle. Such cap holders have cap holding holes 24 positioned along two concentric circular arcs, and each of the holes 24 is large enough to allow the smaller diameter capsule body 2y to pass through, but not the larger diameter cap 2x. The respective cap holders are so constructed as to move up and down by means of a cam (not shown) while they are moving around the circle. The periphery of disk 19 passes over the cap holding holes 24 so that the holes 20 of the disk 19 will come directly above corresponding cap holding holes to permit transfer of the capsules. Two rows of capsule body holding holes 26 are provided on the circumference of a filling disk 25. Each of such holes 26 is so positioned to come directly below a cap holding hole 24 of the cap holder 23 while it is going around, and a suction device, schematically indicated at 27, is provided directly below the hole 26. When a capsule body 2y capped with the cap 2x is inserted into aligned holes 24 and 26 from above, the suction from below pulls the capsule body 2y out of the cap 2x into the capsule body holding hole 26, leaving only the cap 2x in the cap holder 23. Then, the cap holder 23 and the filling disk 25 rotate synchronously. But the holding piece of the capholder 23 holding the cap 2x is moved upwards, as has been described above. The cap holder 23 and the filling disk 25 continue to go around respectively with the cap 2x and the body 2y separated from each other. While they are separated from each other, a desired medicine is put by any suitable device into the capsule body 2x in the filling disk 25. The cap holder 23 comes down directly above the place where the medicine filled capsule body 2y comes around, and at this point the medicine filled capsule body 2y is pushed up by a pushing-up lever 28. which is actuated by another cam (now shown), into the cap 2x held within the cap holder 23 which has come down directly above the said capsule body 2y. Then, the capped capsule body is pushed out of the upper part of the cap holder 23 to complete the whole process.

What is claimed is:

1. Rotary capsule direction arranging and filling equipment, comprising: a capsule feeding device having a horizontally rotating means and vertically depending capsule aligning means depending therefrom for feeding randomly oriented capped empty capsules supplied in bulk to said horizontally rotating means to said vertically depending capsule aligning means for vertically aligning capsules in at least one vertical column with the caps of the capsules up or down; at least one drum means rotatably mounted for rotation around a horizontal axis and having a plurality of radial capsule receiving holes around the periphery thereof, the drum means being positioned beneath said vertically depending capsule aligning means with the holes around the periphery aligned for receiving capsules from the vertically depending capsule aligning means, said drum means including reorienting means therewithin for reorienting the capsules received in said radial holes from a radial direction on said drum to a circumferential direction with the caps of the capsules all facing in the same circumferential direction and for further reorienting the circumferentially positioned capsules to radial positions in said holes with the bodies of the capsules extending radially outwardly of said drum; a horizontally rotatable disk means having a plurality of vertically extending holes around the periphery thereof, said disk means being positioned beneath said drum with the holes aligned with the holes in the drum for receiving the capsules from the holes in the drum as the holes in the drum move past the lowermost portion of the periphery of the drum and moving them around the periphery of said disk means in at least one row with the capsules upright and with the caps of all the capsules on the tops of the upright capsules; a capsule filling means having a horizontally rotatable plate having the periphery passing beneath the periphery of said disk means and having a plurality of capsule receiving holes therein for receiving the upright capsules in the holes in said disk means and having means for removing the caps from the capsule bodies, filling the capsules with a material, and replacing the caps on the capsule bodies; and means for driving said capsule feeding device, said drum, said disk means and said capsule filling means in synchronism for transferring capsules through said equipment.

2. Rotary capsule direction arranging and filling equipment as claimed in claim 1 in which said capsule feeding device comprises a hopper, said horizontally rotating means comprising a horizontally rotatable plate below said hopper having an upwardly projecting conical projection beneath the opening in the bottom of the hopper, said vertically depending capsule aligning means being vertical pipes depending from said plate and opening through said plate, said capsule feeding device further having a plate beneath the lower ends of said pipes at locations other than where said drum is positioned adjacent the bottom of said pipes, said pipes each having an aperture therein at a level above the lower end of the pipe substantially equal to the length of a capsule, a lever having one end opposite said aperture, and means for pivoting the lever into said aperture at the point where the pipe is above the rotatable drum for retaining all but the lowermost capsule in the pipe and allowing only the lowermost capsule to be delivered to the drum.

3. Rotary capsule direction arranging and filling equipment as claimed in claim 1 in which said drum means comprises coaxial drums having capsule receiving holes therein which are aligned in the radial direction of the drums and circumferentially extending openings extending from said capsule receiving holes having a size sufficient for receiving only the capsule bodies, a fixed direction changing piece extending between said concentric drums for being engaged by capsules in said capsule receiving holes as the drums rotate for pivoting the capsules so that the capsule bodies move into said circumferentially extending openings, pushers radially movably mounted within said inner drum adjacent each circumferentially extending opening, and cam means with which said pushers are engaged as said drums rotate for moving said pushers radially outwardly for engaging the pivoted capsules and directing them radially with the capsule bodies radially outwardly and for ejecting capsules from said drums and for retracting said pushers.

4. Rotary capsule direction arranging and filling equipment as claimed in claim 1 in which said capsule feeding device has a plurality of vertically depending capsule aligning means around the periphery of said horizontally rotating means, and there is a plurality of said drum means positioned beneath said vertically depending capsule aligning means at points spaced around the periphery of the horizontally rotating means, and said plurality of drum means receiving capsules from different capsule aligning means simultaneously, and said horizontally rotatable disk means having the holes aligned with the holes in the plurality of drum means for simultaneously receiving capsules from the respective drum means.

* * * * *